Dec. 6, 1955  A. MAURER  2,725,964
FRICTION CLUTCHES
Filed May 10, 1951
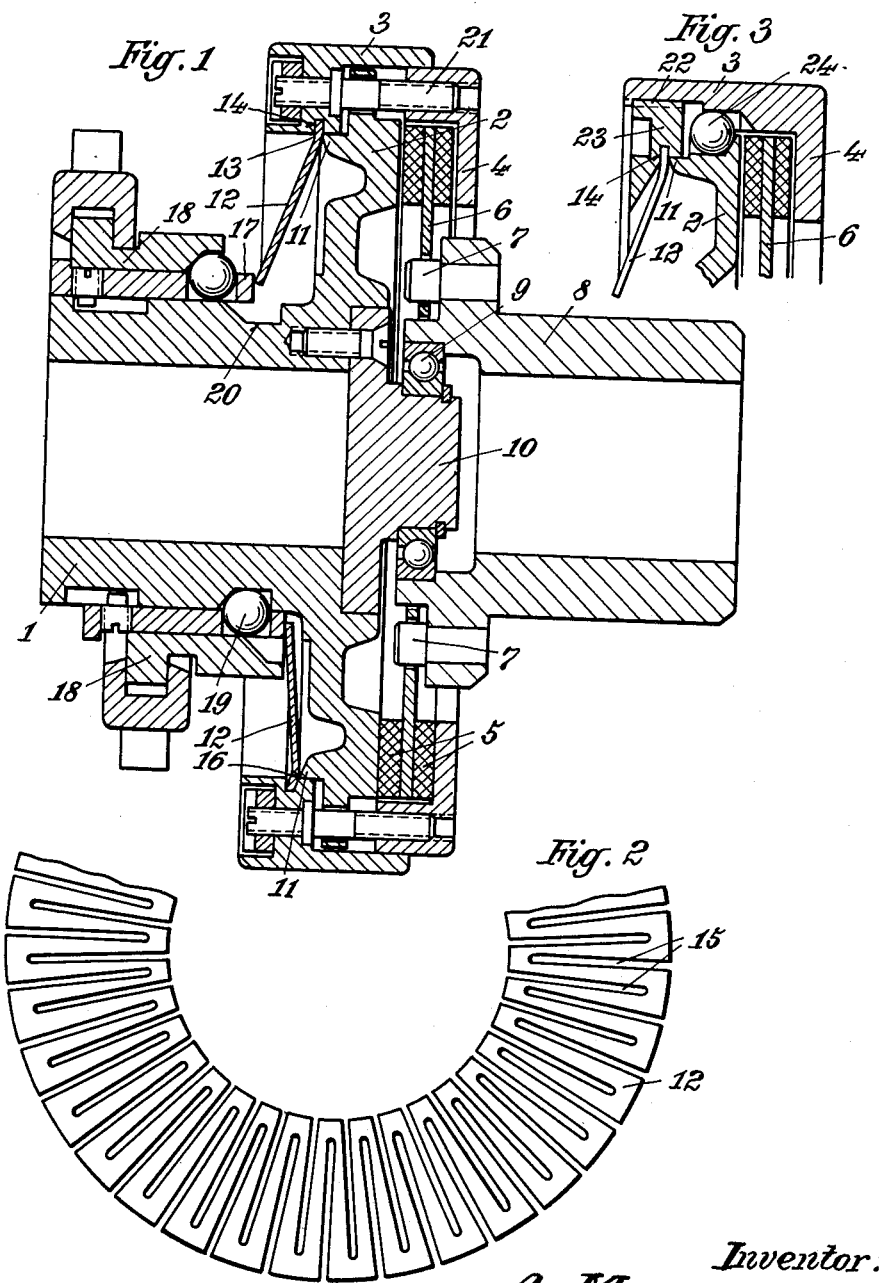

United States Patent Office 2,725,964
Patented Dec. 6, 1955

2,725,964

FRICTION CLUTCHES

Albrecht Maurer, Bad Homburg vor der Hohe, Germany, assignor to Ringspann Gesellschaft m. b. H., Bad Homburg vor der Hohe, Germany Application May 10, 1951, Serial No. 225,582

Claims priority, application Germany May 16, 1950

7 Claims. (Cl. 192—68)

In the known disengageable friction clutches in which the force for the application of pressure to the friction surfaces acts on the inner rim of a radially slotted annular disc supported on its outer part, use has hitherto been made of annular discs, which have only slots starting from the inner rim. Consequently, the annular discs are not compressible in the radial direction, so that they can only be built into a divided clutch body. Moreover, these annular discs are relatively rigid, with the result, that the occurring bending stresses in the plane of the disc soon lead to a breakdown of the annular discs. Finally, the known annular discs which, owing to their flat formation, develop no or only inconsiderable spring forces in the axial direction require separate returning springs for releasing the coupling.

The invention has for its object to overcome these disadvantages through the employment of a conical annular disc of a kind known per se, which has slots starting alternately from its inner rim and outer rim and extending through more than half its breadth. Such an annular disc is yielding in the radial direction and can, therefore, be inserted in an internal groove of the undivided clutch part to be controlled. The special slot arrangement has the further effect that even with the heaviest stressing no destructive bending forces can occur, so that the leverage obtainable with it can be made full use of. Through the consequent flattening of the conical form of the disc spring forces are developed in it, which, on the engaging force ceasing to act, reform the annular disc into its original form and thereby release the clutch without special lifting off springs being required. In particular, it has been found to be of advantage to arrange the outer part of the annular disc in a plane perpendicular to the axis of the coupling and to cause the disc to bear against the stationary part of the clutch at about the place where the conical surface merges into the flat marginal surface.

In the accompanying drawings a constructional example of the arrangement of a friction clutch according to the invention is illustrated in Figure 1 in longitudinal section, Figure 2 being a plan view of part of the annular disc employed, the upper half of Figure 1 showing the clutch in the disengaged and the lower half in the engaged state. Figure 3 shows a modified constructional form.

The friction clutch according to Figures 1 and 2 has a hub 1 to be connected with the driving shaft, which hub is provided with a friction disc 2. On the periphery of the friction disc 2 is supported so as to be non-rotatable and axially slidable a clutch ring 3 which engages over the friction disc and has an inwardly directed annular web 4 parallel to the friction disc 2, acting as a further friction disc. The annular web 4 is adjustably fixed by screw bolts 21 to the clutch ring 3. Between the friction disc 2 and the annular web 4 is disposed a clutch disc 6 covered on both sides with a friction lining 5. It is provided with holes, in which coupling bolts 7 engage, which are connected with a hub 8 for the reception of the shaft to be driven. The hub 8 runs with a ball bearing 9 on a closing part 10 fixed to the hub 1. On its rear side the friction disc 2 has an annular rib 11 which forms the abutment and supporting surface for an annular disc 12 surrounding the hub 1. It is of conical form as regards its main part and has a flat marginal portion 13, with which it engages in an internal groove 14 of the clutch ring 3. Figure 2 shows how the annular disc 12 is divided up by alternately disposed slots 15 starting from its outer and inner rim. With the circular edge 16 forming the transition between the conical inner part and the flat marginal part 13 the annular disc 12 bears against the rib 11.

For operating the clutch a ring 17 is provided which is supported on the hub 1 and bears against the inner rim of the annular disc 12. It can be displaced through the intermediary of balls 19 by a sleeve 18 which is slidable and non-rotatable on the hub 1. For receiving the balls 19 in the engaged position of the clutch an annular groove 20 is provided in the hub 1.

The clutch operates in the following manner. When the clutch is disengaged, the parts occupy the position shown in the upper half of Figure 1. The annular disc 12 has its conical shape, in which the marginal portion 13 is perpendicular to the axis. Through its engagement in the internal groove 14 the coupling ring 3 is displaced to the right and the application pressure of the clutch disc 6 between the friction disc 2 and the annular web 4 is thereby caused to cease.

On the sleeve 18 being displaced to the right, its motion is transmitted by the balls 19 to the ring 17 which presses the annular disc 12 almost flat through pressure on the inner rim. At the same time the marginal part 13 of the annular disc 12 tilts about the circular edge 16 to the left and thereby also displaces the clutch ring 3 on the friction disc 2 to the left. Thereby the clutch disc 6 with the friction linings 5 is clamped between the friction disc 2 and the annular web 4, so that it will rotate with the hub 1 and transmit the rotary motion to the hub 8.

During their displacement the balls 19 will, as the lower half of Figure 1 shows, slip into the annular groove 20, in which they are held by the ring 18 sliding over them. This ring is thereby relieved of the axial counter pressure of the balls 19. On the sleeve 18 moving to the left, the balls 19 will again leave the groove 20 and the annular disc 12 will under the action of its spring force again assume the conical shape. At the same time the marginal part 13 will flatten out again and move the clutch ring 3 to the right, causing the frictional engagement to cease. In the constructional form according to Figure 3 the threaded bolts 21 for the readjustment of the friction disc 4 are replaced by a larger thread. In this arrangement the coupling ring 3 is made in one piece with the annular web 4 acting as friction disc and is supported with the thread 22 on a ring 23 provided with the internal groove 14. The ring 23 is coupled with the friction disc 2 by balls 24 which lie in semi-cylindrical grooves of both parts which are in this way connected with one another so as to be axially displaceable, but non-rotatable. By turning the ring 23 the distance apart of the friction discs 2 and 4 can be very simply and accurately adjusted.

I claim:

1. A clutch assembly for connecting driving and driven shafts wherein such shafts are in substantial axial alignment comprising a clutch element rotatable with the driving element, a second clutch element non-rotatably carried by but slidable along such driving element, a third clutch element non-rotatably carried by but slidable on the driven element, an annular disc of frustoconical shape having an inner and an outer edge surrounding the driving element with the outer edge thereof in operative connection with the second clutch element, the said disc being provided with a series of closely adjacent slots extending alternately from such inner and outer edges, with each slot being of such length as to extend more than one-half the distance from the inner to the outer edges to provide a disc having radial elasticity and means slidable axially of the driving element for engagement with the inner end of the disc to exert pressure upon the disc to flatten such disc thereby displacing the second clutch element axially respecting the first clutch element to move the third clutch element into operative engagement with the first clutch element to transmit movement from the driving shaft to the driven shaft, the resiliency of the disc moving the second clutch element away from the first clutch element when the axially slidable means is moved away from the inner end of the said disc.

2. A clutch element as defined in claim 1 in which the second clutch element is provided with an annular groove in which the outer edge of the annular disc is lodged, with the outer edge of the disc being in a plane perpendicular to the axis of the clutch.

3. A clutch assembly as defined in claim 2 in which a portion of the disc adjacent to said perpendicular portion is fulcrumed against a part of the said first mentioned clutch element.

4. A clutch assembly as defined in claim 1 in which the second clutch element is provided with an annular flange which overlies the first clutch element with the third clutch element being located intermediate such flange and the first clutch element.

5. A clutch assembly for connecting driving and driven shafts wherein such shafts are in substantial axial alignment comprising a clutch element rotatable with one of said shafts, a second clutch element non-rotatably carried by but slidable along the same shaft, a third clutch element non-rotatably carried by but slidable along the other of the shafts, an annular disc of frusto-conical shape having an inner edge and an outer edge surrounding the shaft carrying the first clutch element with the said outer edge having an operative connection with the second clutch element, the said disc being provided with a series of closely adjacent slots extending alternately inwardly from such inner and outer edges, with each slot being of such a length as to extend more than one-half the distance from the inner to the outer edges to provide a disc having radial elasticity and means slidable axially of one of the shafts for engagement with the inner end of the said disc to exert pressure on the disc to flatten the same thereby displacing the second clutch element axially respecting the first clutch element to move the third clutch element into operative engagement with the first clutch element to transmit movement between said shafts, the resiliency of the disc serving to move the second clutch element away from the first clutch element when the axially movable means is moved away from the inner end of the said disc.

6. A clutch assembly for connecting a driving shaft to a driven shaft wherein such shafts are in substantial axial alignment comprising a hub connecting with the driving shaft, a friction disc on the hub, an annular rib on the friction disc, a clutch ring non-rotatably and axially slidable carried by the friction disc having an internal groove therein, an inwardly directed web parallel to the friction disc connected to the clutch ring and serving as a further friction disc, a clutch disc disposed between the friction disc and the web slidably but non-rotatably connected to the driven shaft, friction rings rigidly secured to the clutch disc, a conical annular disc having an inner edge and an outer edge surrounding the driving shaft with the outer edge of the disc lying in a plane perpendicular to the axis of the clutch assembly and lodged in the groove of the clutch ring, the annular disc having a series of closely adjacent slots extending alternately inwardly from the outer and inner edges of the annular disc, with each slot being of such a length as to extend more than one-half the distance from the inner to the outer edges of such annular disc to provide a disc having radial elasticity, with the portion of the disc adjacent the outer edge fulcrumed against the annular rib on the friction disc, and means slidable axially of the driving shaft for engagement with the inner end of the annular disc to flatten such annular disc and move the web to bind the clutch disc to the friction disc to transmit movement from the driving shaft to the said driven shaft, the resiliency of the annular disc serving to move the web away from the friction disc when the axially slidable means is moved away from the inner end of the said annular disc.

7. A clutch assembly as defined in claim 6 wherein a coupling ring is integral with the web and is provided with axial grooves and balls are slidable in such grooves and in complemental grooves formed in the friction disc.

References Cited in the file of this patent

UNITED STATES PATENTS

| 748,569 | Anderson | Jan. 5, 1904 |
| 1,157,789 | Lanzdorf | Oct. 26, 1915 |
| 2,117,482 | Klix | May 17, 1938 |
| 2,217,529 | Spase | Oct. 8, 1940 |
| 2,229,319 | Wesselhoff | Jan. 21, 1941 |
| 2,257,912 | Kraft | Oct. 7, 1941 |
| 2,380,677 | Schjolin | July 31, 1945 |
| 2,399,886 | Odevseff | May 7, 1946 |
| 2,508,558 | Wolff | May 23, 1950 |
| 2,639,013 | Meschia | May 19, 1953 |